March 18, 1958  W. C. JOHNSON ET AL  2,827,233
DIGITAL TO ANALOG CONVERTER
Filed Dec. 13, 1954  5 Sheets-Sheet 1

SCALE A : X1
SCALE B : X16
SCALE C : X256

INVENTORS: W. C. JOHNSON
J. G. TRYON
BY
H. O. Wright
ATTORNEY

March 18, 1958 W. C. JOHNSON ET AL 2,827,233
DIGITAL TO ANALOG CONVERTER
Filed Dec. 13, 1954 5 Sheets-Sheet 2

INVENTORS: W. C. JOHNSON
J. G. TRYON
BY
H. O. Wright
ATTORNEY

March 18, 1958 W. C. JOHNSON ET AL 2,827,233
DIGITAL TO ANALOG CONVERTER
Filed Dec. 13, 1954 5 Sheets-Sheet 4

INVENTORS: W. C. JOHNSON
J. G. TRYON
BY
H. O. Wright
ATTORNEY

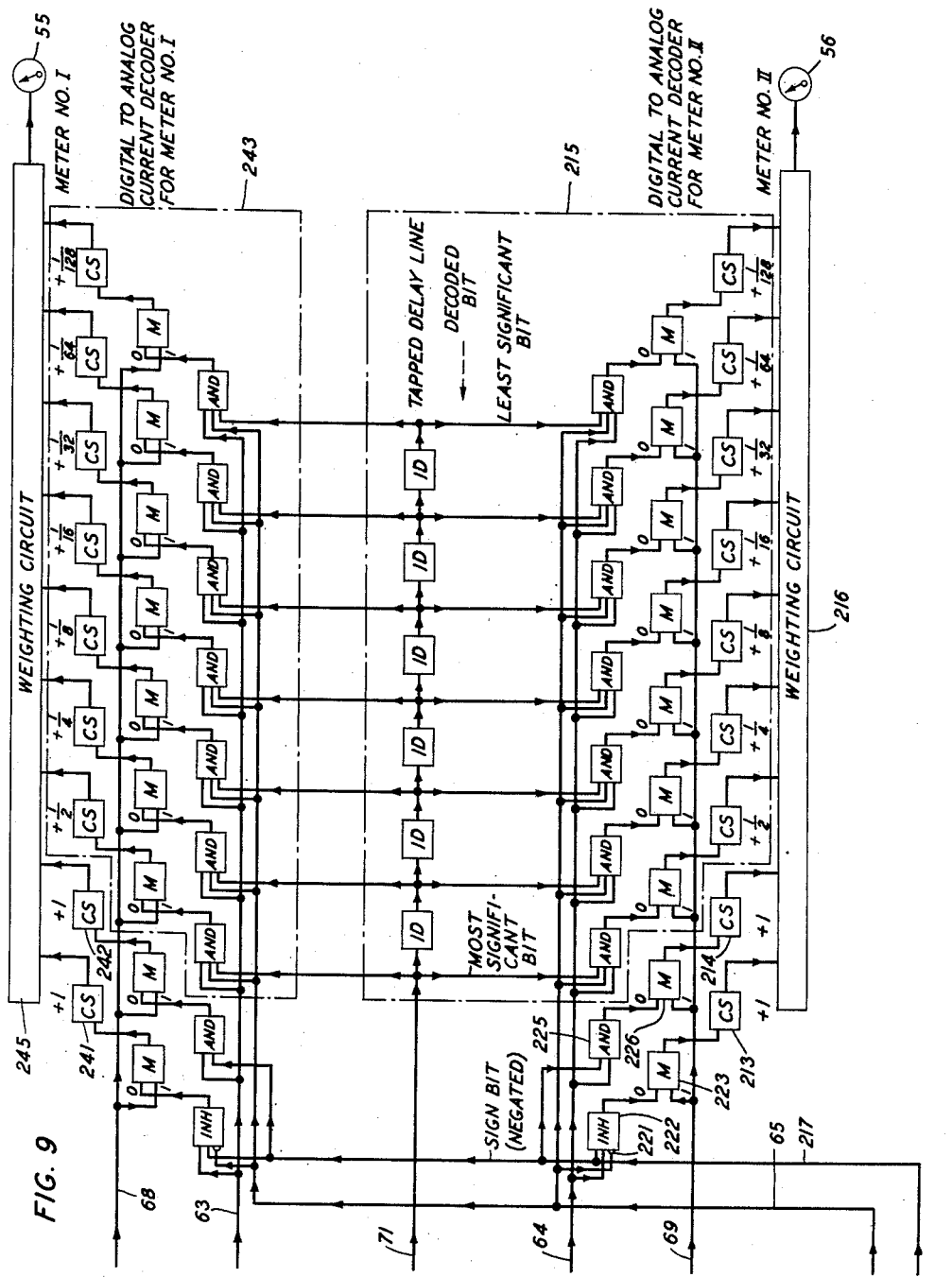

United States Patent Office 2,827,233
Patented Mar. 18, 1958

2,827,233

DIGITAL TO ANALOG CONVERTER

Walter C. Johnson, Summit, and John G. Tryon, Chatham, N. J., assignors to Bell Telephone Laboratories, Incorporated, New York, N. Y., a corporation of New York Application December 13, 1954, Serial No. 474,660

8 Claims. (Cl. 235—61)

This invention relates to the conversion of digital information into analog form, and more particularly, to electrical circuits for converting multi-digit numbers into analog representations, such as the deflection of a meter pointer, requiring a lesser degree of accuracy than the original digital information.

In working with electrical circuits involving code representations of quantities, it is often desirable to obtain a visual representation of the quantities represented by multi-digit codes. For example, it is much easier to look at the pointer of a meter and to take a reading from an associated scale than to mentally decipher a binary number such as 0.011000111000111, by way of typical example, which includes sixteen binary digits, or "bits," of information. However, because meters can only be read with an accuracy of about one percent of the full scale reading, it is also desirable to be able to change the effective value of the meter's full scale reading so that small numbers may be read more accurately.

A principal object of the present invention is, accordingly, to improve and simplify digital to analog conversion circuits.

By application of the principles of the present invention, the cost of a digital to analog converter having several scales of conversion can be greatly reduced by converting only a selected group of consecutive digits, for example seven consecutive digits, of the total number of consecutive digits, for example sixteen, of the digital representation, into analog form. The present circuits are particularly applicable to systems in which the required accuracy of the analog representation is somewhat less than that of the digital representation. An important aspect of the present invention involves a circuit, designated for the purposes of this application as a "skipped bits checker," which detects the presence of digits other than zero among the digits which are more significant than the most significant digit of the particular selected group of consecutive digits. For example, in converting a number made up of sixteen binary digits, or "bits" of information, into a meter reading, the seven least significant digits may be selected for conversion into the meter deflection when it is believed that the number is very small. However, if a more significant digit than the most significant of the seven selected digits is present, a "skipped bits checker" circuit is provided which makes the meter read full scale. In such a case, the selection circuit should be switched to select a group of consecutive digits of greater significance. Conversely, when a very small meter reading is obtained, the selection circuit should be switched to select a less significant group of digits.

The present circuits are particularly advantageous in following the progress of a conditioning process, such, for example, as a heat treating operation or a chemical reaction in terms of time of treatment. At the start, a relatively large time may be involved which may be adequately represented by the seven most significant digits of the sixteen digit number. However, as the end of the process is approached, the time remaining grows smaller approaching zero, and can only be adequately represented by the seven least significant digits.

Other objects and various advantages and features of the invention will become apparent by reference to the following description taken in connection with the accompanying drawings forming a part thereof, and from the appended claims.

In the drawings:

Figs. 8 and 9 together make up a detailed logic circuit diagram of the illustrative digital to analog conversion circuits shown in Fig. 3.

Figure 1:
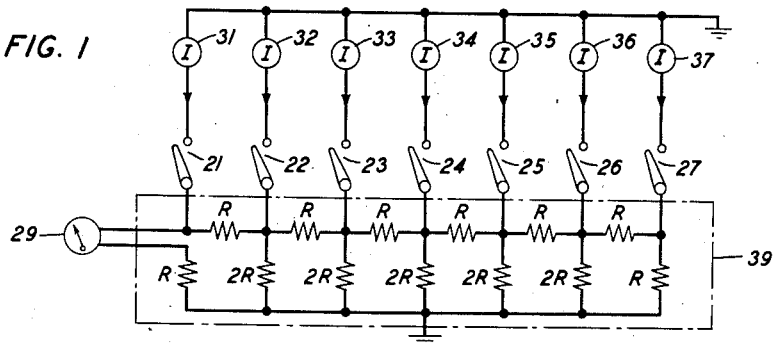
Fig. 1 is an electrical schematic diagram showing a possible form of digital to analog conversion circuit related to conversion circuits of the invention.

Referring more particularly to the drawings, Fig. 1 shows, by way of example and for purposes of illustration, an operative form of a seven digit digital to analog current decoding circuit employed to explain particular features of this general type of circuit. In the circuit of Fig. 1, the digital information is presented by the appropriate closure of switches 21 through 27, respectively, and the analog output is indicated by the reading of the ammeter 29. The switch 21 is closed if the most significant digit is present, and the balance of the switches 22 through 27 are closed or opened if successive less significant digits are present or absent, respectively. The switches 21 through 27 connect the like current sources 31 through 37, respectively, to a resistance weighting circuit 39, to be referred to hereinafter as a "weighting circuit." With the relative values of the resistances in the network 39 being indicated by the letters R and 2R, the weighting of the current supplied by switch 22 to ammeter 29 is one half that of switch 21. The weighting of the current supplied by each successive switch 23 through 27 is similarly one half that of the preceding switch, and thus matches the reduction in significance of the successive binary digits.

Figure 2:
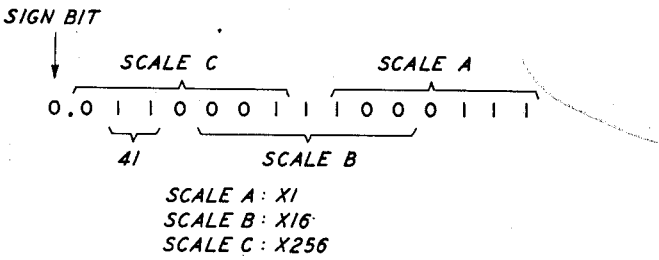
Fig. 2 shows a sixteen "bit" binary number and indicates three selections of seven consecutive digits to provide three scales for converting the binary number to an analog representation.

The seven digits which may be decoded in the circuit of Fig. 1 correspond to the seven digits of scale A, scale B, or scale C of Fig. 2. In the present illustrative circuits, the digital number which is to be decoded is a serial binary number having sixteen binary digits or "bits." As illustrated in Fig. 2, the sixteen digit binary numbers which are employed in the present circuits include a "sign" digit or bit, and fifteen other digits or bits.

Because the analog output meter 29 of Fig. 1 can be read to only seven significant binary places, scale selection is employed so that both large and small numbers may be accurately translated. To perform this change of scale, it was originally suggested that the entire binary number be translated into a current magnitude, and a conventional multi-scale ammeter be employed to measure the current. However, the electrical circuitry associated with the translation of all sixteen binary digits led to an unduly elaborate digital to analog conversion circuit.

In accordance with the present invention, the required circuitry for the converter has been reduced by nearly one half through the use of scale selection at the digital level, instead of using a variable scale ammeter after converting the entire number to analog form. As shown in Fig. 2, the present illustrative circuits provide three scales identified as A, B, and C in Fig. 2. The operator selects the desired scale by a manually set mechanical switch. When scale A is selected, the meter displays the seven least significant digits; when scales B and C are selected, the readings on the meter are respectively 16 and 256 times greater than those of scale A.

Although the method of the present invention in which scales are changed on a digital basis rather than by a multi-scale ammeter results in substantial savings in equipment, it also requires some special circuitry to avoid errors. For example, considering the binary number shown in Fig. 2, scale C should be employed for decoding, since it includes digits of greater significance than does scale B or scale A. However, if the operator selects scale B, the meter would read substantially less than half scale in decoding the digits 0011100 bracketed by scale B, if no special circuit were provided to note the more significant digits designated 41 in Fig. 2. As will be explained in detail hereinafter, however, a "skipped bits checker" circuit is provided to detect these "skipped bits" 41 and to make the meter read full scale under these circumstances, i. e., if the scale selected does not include the most significant digit which is actually present in the binary number being converted.

Figure 3:
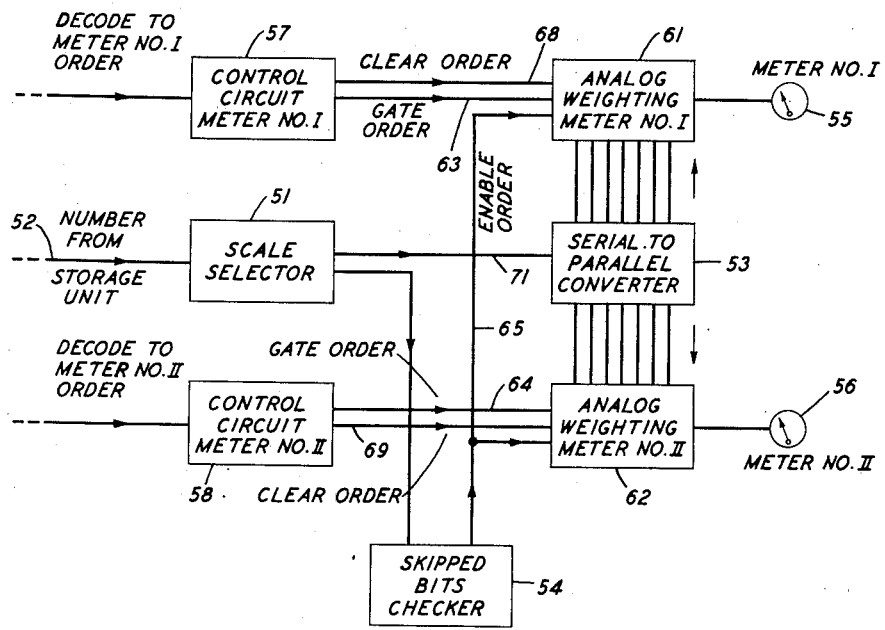
Fig. 3 is a block diagram of an illustrative digital to analog converter circuit in accordance with the present invention.

The block diagram of Fig. 3 illustrates the interconnections between the various components which are employed in the circuit illustrating the present invention. In Fig. 3 the principal components are the scale selector 51, the control circuits 57 and 58 for Meter No. I and Meter No. II, respectively, the "skipped bits checker" circuit 54, the serial to parallel converter 53, and the analog weighting circuits 61 and 62 for Meter No. I and Meter No. II, respectively. The circuit details of the units shown in block form in Fig. 3 will be disclosed in detail in the logic circuit of Figs. 8 and 9. The number which is to be decoded is applied to the scale selection unit 51 by lead 52. The seven digits of the binary number which are to be decoded are chosen by the scale selector 51 and are forwarded to the serial to parallel converter 53. Digits which are more significant than the seven selected digits are routed to the "skipped bits checker" 54 for inspection.

Two meters 55 and 56 are provided and display the analog representations of two different numbers, respectively. Individual control circuits 57 and 58, and individual analog weighting circuits 61 and 62 (each of which includes a circuit similar to that of Fig. 1) are provided for the meters 55 and 56, respectively. A gate order on lead 63 or 64 from the control circuit of the meter which is to display the number permits the transfer of the number from the serial to parallel converter 53 into the appropriate weighting circuit 61 or 62. If an enable order is applied to lead 65 by the "skipped bits checker" 54 indicating that the proper scale has been selected, the new digits are registered in the weighting circuits 61 and 62, the previous seven digits having been cleared from the weighting circuit by a clear order on lead 68 or 69.

In Figs. 4, 5, 7, 8 and 9 which follow, the circuits are shown in terms of the "building blocks" or basic packaged circuit units which may be employed in a digital computer. While the specific circuits which have been employed in these basic computer components have taken many different forms, one satisfactory set of circuits is disclosed in an article entitled, "Regenerative Amplifier for Digital Computer Applications" by J. H. Felker, which appeared at pages 1584 to 1596 of the November, 1952 issue of the "Proceedings of the I. R. E." (volume 40, Number 11). The five basic logic circuit elements which are disclosed on pages 1594 and 1595 of this article, and which appear in the Figures 4, 5 and 7 through 9, are as follows:

(1) Or units yield a pulse output if a pulse is present at any of the inputs to the Or units. Or units, such as that shown at 174 in Fig. 7 which include a pulse regenerator, are designated by the simple legend "Or"; Or units in which the circuit requirements are such that a pulse regenerator is not required, such as Or unit 191 in Fig. 8, are designated by the legend "Or" followed by a plus sign in parentheses: "(+)".

Figure 5:
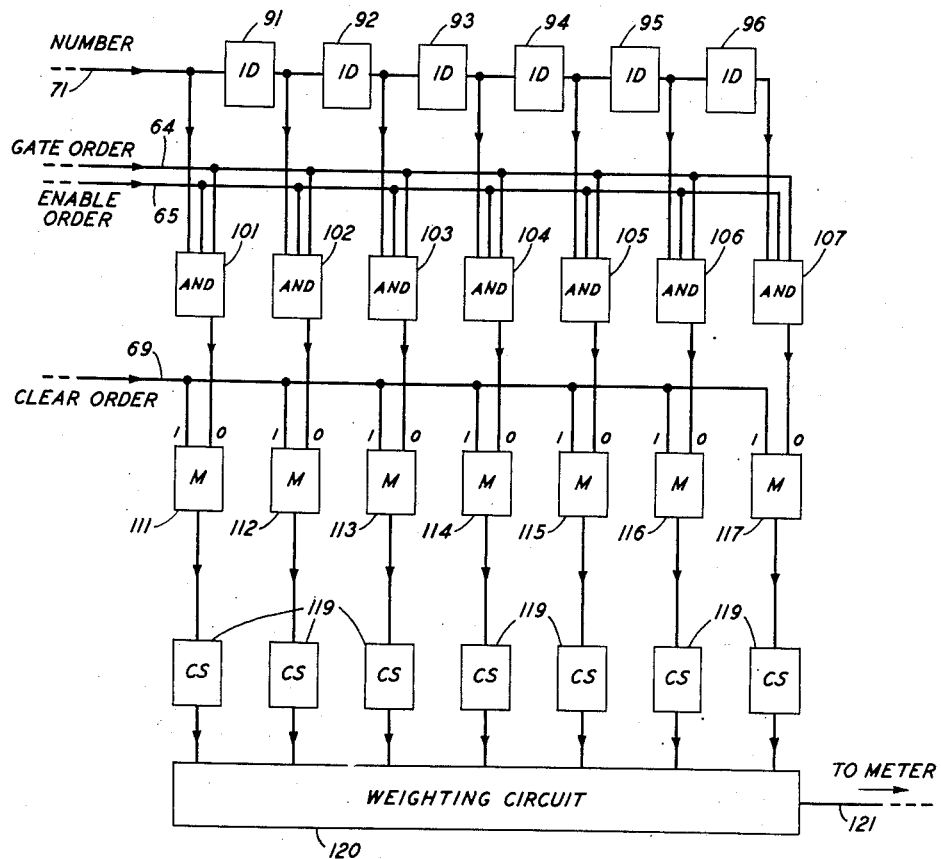
Fig. 5 is a block diagram of the present serial to parallel conversion logic circuit and the analog weighting circuit employed in the circuit of Fig. 3.
Figure 7:
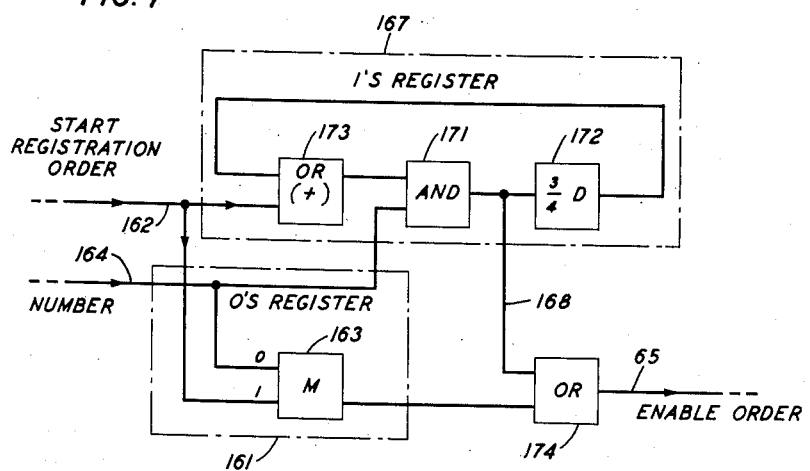
Fig. 7 is a "skipped bits checker" circuit which is a component of the circuit of Fig. 3.
Figure 8:
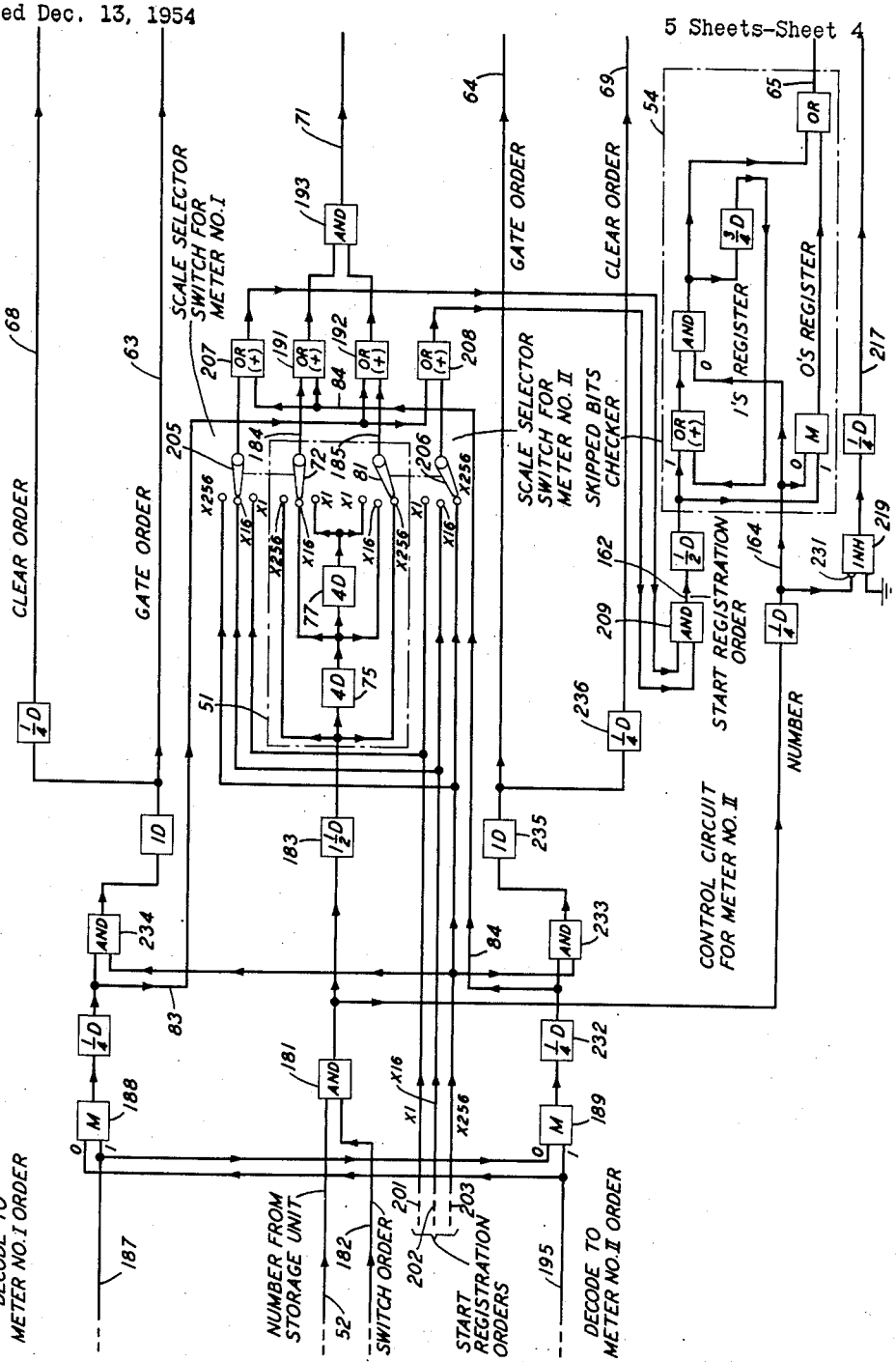

(2) And units, such as 101 through 107 in Fig. 5 and 171 in Fig. 7, require energization of all input leads to yield a pulse output.

(3) "Inhibit" units are shown at 219 in Fig. 8, and at 222 in Fig. 9, for example. An inhibit unit is designated by a box with the legend "Inh" therein. It is generally similar to an And unit in that all of the normal inputs to the unit must be energized for it to yield an output pulse. However, a pulse on the inhibit input lead (marked with a small semicircle at the point where the inhibit lead connects to the inhibit box) will over-ride all other signals and block the output of the unit.

(4) Memory units, such as those shown at 111 through 117 in Fig. 5, for example, are designated by boxes with the letter "M" therein. A memory unit, for the purposes of the present invention, is a unit which may be set to either of two conditions, the "0" state or the "1" state. When set to the "0" state, it has no output. When the "set 1" lead has been energized, however, the memory unit generates pulses, one at each digit interval, until the memory unit is reset to the "0" condition. When both input leads are energized simultaneously, the memory unit assumes the "0" state, and has no output.

Figure 4:
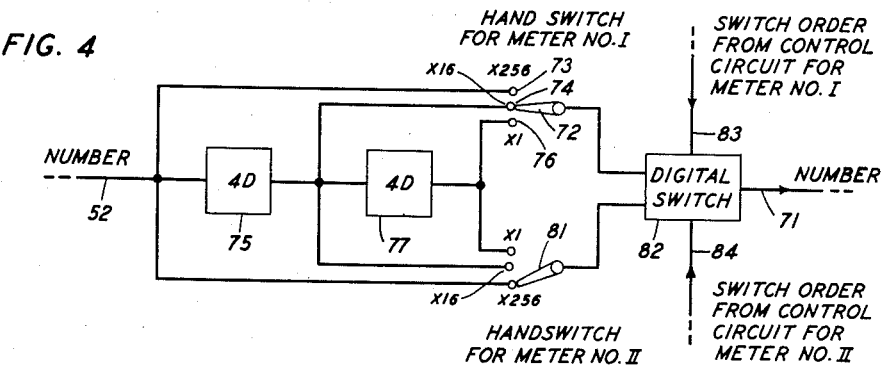
Fig. 4 shows one form of scale selector switching circuit which may be employed in the circuit of Fig. 3.

(5) Delay units, such as those shown at 75 in Fig. 4, and at 91 through 96 in Fig. 5, are indicated by boxes with the letter "D" therein, together with a number indicating the number of digit periods of delay included in the unit.

The And, inhibit, and memory logic circuit units noted above also introduce a delay of one-quarter digit period, or one-quarter microsecond. The Or units including a pulse regenerator also introduce one-quarter digit period of delay, but other Or units designated "Or(+)" introduce no appreciable delay. These delays are taken into consideration in the detailed schematic drawing of Figs. 8 and 9.

As disclosed in the article by J. H. Felker cited above, the pulse regenerator is an important part of these logical circuits. The specified pulse regenerator circuit shown in the Felker article operated satisfactorily and may be used. However, an improved version of the regenerator appears in J. H. Felker application Serial No. 376,923 filed August 27, 1953, assigned to the assignee of the present application, and this circuit may also be employed.

In Figs. 3 and 4, the number which is to be decoded appears at the input lead 52 to the scale selector and is a serial binary number. The serial binary number is a sixteen digit binary number which may correspond, for example, to that shown in Fig. 2. The successive digits of the binary numbers appear at lead 52 at one microsecond intervals, with pulses or spaces corresponding to the digits "1" and "0" respectively, with the least significant digit appearing first in time. Accordingly, the entire binary number is made up of sixteen "time slots," the digits "1" of the binary number being represented by pulses in the appropriate "time slots" and the digits "0" being represented by "time slots" having no pulses. With the time between successive "time slots" (termed a "digit period") being equal to one microsecond, the entire sixteen digit number appears at lead 52 in a sixteen microsecond time period.

The selection circuit of Fig. 4 selects the desired group of seven digits by delaying the number for the required period of time before forwarding it on lead 71 to the serial to parallel converter 53 (shown in Fig. 3). When the switch 72 is in its highest position, contacting terminal 73, the serial binary number is not delayed at all, and scale C of Fig. 2 is selected. When the switch arm 72 is contacting terminal 74, however, as shown in Fig. 4, the delay unit 75 introduces four digit periods of delay, and scale B of Fig. 2 is selected. The fixed timing of the conversion circuits coupled to lead 71 cause the scale shift when the number is delayed. Similarly, when the switch arm 72 is contacting terminal 76, another four digits of delay are introduced by delay unit 77, and scale A of Fig. 2 is selected. The lower switch 81 may be hand set to control the scale of Meter No. II in the same manner as described above for the upper switch.

The digital switch 82 is controlled by switching orders on leads 83 and 84. When lead 83 is energized, the number is connected to output 71 from switch 72; and when lead 84 is energized, the number is connected to output 71 from switch 81.

Fig. 5 illustrates serial to parallel binary number conversion and analog weighting for one meter. To simplify Fig. 5, the provisions for negative numbers and for full scale readings when a "skipped bit" is present have not been included. These arrangements are shown in Figs. 8 and 9.

In Fig. 5, a properly timed number is applied at lead 71 to the input of the delay line made up of the six delay units 91 through 96, each of which includes one digit period of delay. When the seven digits to be decoded are located at the seven taps of the delay line, a gate order is applied to lead 64. If an enable order from the "skipped bits checker" 54 is also present on lead 65, two of the three inputs to each of the And units 101 through 107 will be energized. The transmission of a pulse through each of the And units 101 through 107 is contingent upon the presence of digit pulses at the seven taps of the delay line made up of units 91 through 96. Accordingly, a pulse pattern corresponding to that of the selected seven digits appears at the outputs of And units 101 through 107.

Simultaneously with the arrival of pulses from some of the And units 101 through 107 at the "set 0" inputs of the memory units 111 through 117, a clear order is applied on lead 69 to the "set 1" inputs of all of the memory units 111 through 117. Because the present memory units assume the "0" state if two inputs are applied simultaneously, the digital indications supplied by the And units over-ride the clear order. However, the clear order resets all of the memory units which do not receive "set 0" indications from the And units to the "1" conditions. This avoids the retention of undesired information from the conversion of the previous number.

The states of the memory units 111 through 117 thus reflect the presence or absence of pulses at the taps of the delay line including units 91 through 96. As will be explained in detail in connection with Fig. 6, a current switch 119 is turned on when the associated memory unit has zero output, and is turned off when the memory unit is set to the "1" state and has a pulse output. The current switches are turned on to feed increments of current into a weighting circuit 120 such as that shown at 39 in Fig. 1, and the resultant analog current is applied to a meter by lead 121.

Figure 6:
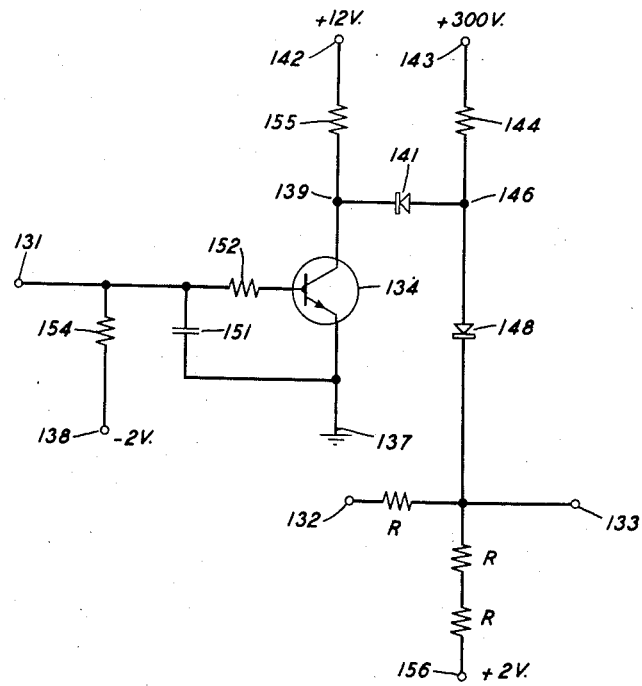
Fig. 6 is a circuit diagram of a current switch which is a component of the circuit of Fig. 5, for example.

Fig. 6 shows a detailed circuit diagram of the current switches shown in Fig. 5 at 119, for example. Terminal 131 is the input of the current switch, and terminals 132 and 133 are connected to the ladder resistance network shown at 39 in Fig. 1. When the memory unit coupled to input terminal 131 is set to the "1" state, the transistor 134 conducts, and little or no current appears at the ladder network. When the memory unit associated with the input terminal 131 is set to its "0" state, the transistor is cut off, and a substantial increment of current is applied to the output ladder network.

Considering the operation of the circuit in detail, the emitter of the transistor 134 is connected to ground at point 137. When the memory unit coupled to the input terminal 131 is set to the "0" state, the input terminal is essentially open circuited, and the base of the transistor drops to near the minus two volts applied to terminal 138. With the base negative with respect to the emitter of the N–P–N transistor 134, the transistor is cut off. Accordingly, the point 139 on one side of the diode 141 rises to the potential of approximately twelve volts, which is applied to terminal 142. The relatively high voltage applied to terminal 143, together with the resistance 144, make up a constant current source. This maintains point 146 at approximately plus eight volts. With point 146 at plus eight volts and point 139 at plus twelve volts, the diode 141 will be cut off. The constant current source made up of the voltage applied to terminal 143 and the resistance 144 will then be applied to the output ladder network through diode 148. The resistances in the output ladder network are designated by the letter R to correspond generally with the resistances R and 2R of the output ladder network 39 of Fig. 1.

The conditions in the current switch will now be considered when the memory unit associated with terminal 131 is set to the "1" state. Under these conditions, the base of the transistor 134 will be raised to a positive potential of about one or two volts. Although the output from the memory unit is a series of pulses, the filter network made up of the capacitance 151 and the resistance 152 will act to smooth out the pulses and maintain the positive voltage at the base of the transistor 134. This voltage now biases the emitter in the low resistance direction, and the transistor 134 conducts. Point 139 drops to a voltage which is close to the ground potential of point 137. With point 146 at approximately plus eight volts and point 139 near ground, diode 141 conducts, and point 146 also drops to close to ground potential. The small positive voltage applied to terminal 156 biases diode 148 to its high resistance condition, and no increments of current will be applied to the ladder output network from the current source made up of the voltage applied at terminal 143 and the resistance 144.

By way of example, but not of limitation, the following values may be employed for the circuit elements which appear in Fig. 6:

Resistance 154_____ 47,000 ohms.
Capacitance 151_____ 150 micromicrofarads.
Resistance 144_____ 469,000 ohms.
Resistance 155_____ 10,000 ohms.
Resistance 152_____ 1,000 ohms.
Diodes 141 and 148_____ silicon diodes.
Transistor 134_____ Western Electric type 1853 N–P–N junction transistor.

The resistances in the ladder network correspond to approximately 3,830 ohms. Thus, in Fig. 1 where the symbol 2R appears, the resistance is 7,660 ohms.

Before proceeding to a detailed consideration of Fig. 7 it is necessary to consider the nature of the binary representation of numbers which is used in the computer circuits of the present invention. For example, the number illustrated in Fig. 2 is a positive number as indicated by a "0" in the sign bit position, which is the only digit position to the left of the binary point. In the present computer system, the binary point is never moved, and all significant numbers (except the sign bit) are always to the right of the binary point. Accordingly, no numbers greater than plus one or less than minus one may be represented. In the present computer circuits a negative number is represented by its complement on two. To form a negative number from a positive number in the present system, it is necessary to change all zeros to ones and all ones to zeros, and add a one in the least significant position. For example, two illustrative positive numbers and their negative counterparts are set forth below:

Table I

| Positive | Negative |
|---|---|
| 0.000000000000011 | 1.111111111111101 |
| 0.111111111111100 | 1.000000000000100 |

The "skipped bits checker" circuit of Fig. 7 is required when the scale selection switch is set to scale A or scale B (see Fig. 2) in order to accurately represent small numbers. As indicated by the first line in Table I above, a small positive number has a "0" sign bit, and the other digits are also "0" until the first significant "1" appears. Similarly, the sign bit of a small negative number is a "1," and the other digits are also "1" until the first significant "0" appears. With any given scale setting, therefore, all of the digits, including the sign bit, which are more significant than the seven selected digits, should be "0," or all of the digits should be "1". If there is a combination of "0" and "1" digits, the scale selection switch has been set to the wrong scale and should be reset to scale B or C.

The "skipped bits checker" of Fig. 7 is, therefore, arranged to yield a properly timed output enabling pulse on lead 65 if the "skipped bits" are all of one type or the other. The "0's, register" 161 determines if all of the examined digits are "0". The start registration order applied on lead 162 sets the memory package 163 to the "1" state. The digits which are being examined are then applied to the "set 0" lead of the memory unit 163 by lead 164. If any of these digits are "1," the memory unit will be reset to the "0" state. If none of the examined digits are "1," however, the memory unit 163 will continue to supply pulses, and, in particular, will supply a pulse when the enable order is required on lead 65.

The "1's register" 167 supplies an output enabling pulse at lead 168 if all examined pulses are "1". If the first examined digit, which arrives at the And unit 171 concurrently with the start registration order, is a "1," a pulse is introduced into the register delay loop. This delay loop including the And unit 171, the three-quarter digit period delay unit 172, and the Or unit 173 has a total delay of one digit period. Accordingly, the pulse circulating in this register appears at the input to the And unit 171 concurrently with the arrival of the next digit of the number. As long as these successive digits are "1," the pulse will circulate in the register and output pulses will be applied to lead 168. If a "0" appears at the input to the And unit 171, however, the circulating pulse will be blocked and no additional pulses will appear on lead 168. The Or unit 174 transmits enabling pulses from either register to the analog weighting circuits on lead 65.

Figs. 8 and 9 together form a detailed logical circuit diagram which utilizes the separate components which have been described above. In general, the components have the same arrangement as in the block diagram of Fig. 3. For example, the "skipped bits checker" 54 appears in the lower right-hand corner of Fig. 8, and the scale selector 51 appears near the center of Fig. 8. Accordingly, the principal emphasis in the description of Figs. 8 and 9 will be on the control circuits and the other circuits which interconnect the component units.

Referring to the left-hand side of Fig. 8, a number from the storage unit of a computer is applied to lead 52. This number is gated through the And unit 181 by a switch order on lead 182. The number passes through the one and one-half digit period delay unit 183 (which is required for timing purposes) to the scale selector switch 51. The function of this scale selector switch has been discussed above in connection with Fig. 4. The number will then appear at leads 184 and 185 at the output of the switch 51. Assuming that the number in question is to be decoded in Meter No. I, a pulse on lead 187 (upper left-hand corner of Fig. 8) has set memory unit 188 to the "1" state and memory unit 189 to the "0" state.

When the number applied to lead 52 is to be applied to Meter No. I, it is desired that the upper output lead 184 from the selection switch 51 be selected for connection to the lead 71 rather than the lower output 185. This selection is accomplished by the Or units 191 and 192, and the And unit 193. The signal input circuits 184 and 185 are connected respectively to the Or units 191 and 192. Separate control input leads 83 and 84 are also connected respectively to Or units 192 and 191. These control leads 83 and 84 reflect the condition of the memory units 188 and 189, respectively, with which they are associated. Accordingly, when Meter No. I is selected by a pulse on lead 187 as discussed above, a series of pulses appear on control lead 83, and control lead 84 is de-energized. Therefore, the output from the Or unit 192 is a continuous train of pulses, notwithstanding the nature of the signal input at lead 185 to the Or unit 192. With the control input lead 84 to the Or unit 191 de-energized, however, the signal on lead 184 will appear at the output of Or unit 191. Furthermore, the signal output of the Or unit 191 will be gated through the And unit 193 to output lead 71 by the continuous train of pulses from the Or unit 192.

When Meter No. II is selected, a pulse is applied to lead 195 at the lower left-hand side of Fig. 8, instead of to lead 187. This sets memory unit 189 to the "1" state, and memory unit 188 to the "0" state. The condition of control leads 83 and 84 is now reversed as compared with the situation described in the preceding paragraph, and the switch made up of the Or units 191 and 192 and the And unit 193 now connects the signal from lead 185 throuhg to the output lead 71.

In the description of the "skipped bits checker" of Fig. 7, the need for a properly timed "start registration" order at lead 162 was mentioned. Properly timed "start registration" pulses for each of the three scales A, B and C (see Fig. 2) which may be selected appear at leads 201, 202 and 203. The pulses applied to these three leads are spaced apart by four digit periods, corresponding to the delays introduced by delay units 75 and 77 in the scale selector. As the manual switches 72 and 81 are operated to select the desired group of seven digits, the switches 205 and 206, respectively, are switched to select the corresponding "start registration" order lead.

The signal from the upper switch 205 is connected to the input lead 162 of the "skipped bits checker" 54 when Meter No. I is selected by an appropriate pulse on lead 187 (upper left-hand side of Fig. 1). Similarly, the output from the lower start registration switch 206 is connected to lead 162 when Meter No. II is selected by a pulse on lead 195. In this selection operation, the Or units 207 and 208 and the And unit 209 operate in precisely the same manner as the switch made up of Or units 191 and 192 and And unit 193 described above.

Referring to Fig. 9, Meter No. I and Meter No. II are designated 55 and 56, respectively. Each meter 55, 56 is an ordinary microammeter having a pointer which is biased to the left-hand side of the scale when no current is applied to the meter. However, the scale drawn on the face of the meter is a standard zero-center scale. Positive numbers are read on the right-hand side of the dial, and negative numbers are read on the left.

The energization of the meter 56 is controlled by the weighting circuit 216 which receives current from current switches 213, 214, and the current switches in circuit 215. The weighting circuit 216 is similar to that shown at 39 in Fig. 1, but includes two additional input current switches. The two current switches 213 and 214 provide the biasing current required for the meter to read in the proper portion of the scale. The circuit 215 shown set off by dashed lines in Fig. 9 translates the seven selected binary digits into an analog current. This circuit 215 operates as described above in connection with Figs. 1 and 5. The current supplied by all of the current switches in circuit 215 when they are turned on is nearly sufficient to make the meter 56 read one-half full scale. The current from either current switch 213 or 214 is weighted to supply sufficient current to the meter 56 to make it read one-half of full scale. Accordingly, when one of switches 213 and 214 is energized (and no other current switches are on) the meter pointer is centered and reads zero on the zero-center scale. When neither of the two switches is on (and no other current switch is on), meter 56 shows a maximum negative reading; and when both switches 213 and 214 are on, the meter 56 shows a maximum positive reading.

The current switches 213, 214 and those in circuit 215 are shown connected directly to the meter 56. However, in the actual circuit the current switches are coupled to the ammeter 56 by means of a current weighting ladder such as that shown in Fig. 1. The numbers under the current switches indicate their weighting, the number +1 under current switches 213 and 214 indicating that the energization of each switch moves the pointer of meter 56 through the digital range of −1 to 0 or from 0 to +1. The current switches in circuit 215 add incremental current values, as indicated by the fractions under each current switch.

Before proceeding with a detailed description of the control circuits for the current switches, the desired combinations of current switch conditions are as follows:

Table II

| Type of Number | Current Switch 213 | Current Switch 214 | Current Switches In Circuit 215 |
| --- | --- | --- | --- |
| (1) Positive—No "Skipped Bits". | Off | Energized | Enabled. |
| (2) Positive—"Skipped Bits" Present. | Energized | Energized | Off. |
| (3) Negative—No "Skipped Bits." | Off | Off | Enabled |
| (4) Negative—"Skipped Bits" Present. | Off | Off | Off. |

As indicated in Table II, the state of current switches 213, 214, and the current switches in circuit 215 depends (1) on the sign of the number to be decoded and (2) on the presence or absence of "skipped bits." These two determining factors are indicated on leads 65 and 217. As mentioned hereinbefore, lead 65 will be energized by an enable pulse from the "skipped bits checker" 54 if there are no "skipped bits." The sign of the number is indicated on lead 217 by the presence of a pulse if the number is positive, and the absence of a pulse if the number is negative. This indication involves negation of the sign bit because, as indicated by Table I, a positive number has a "0" sign bit, while a negative number has a sign bit of "1." This negation operation is accomplished by the inhibit unit 219 of Fig. 8, as will be described in more detail hereinafter.

With the control pulses on leads 65 and 217, as mentioned in the preceding paragraph, the instrumentation of the four current switch conditions detailed in Table II will now be considered. When the number is positive and there are no "skipped bits," there will be a pulse present on both leads 65 and 217, concurrently with the arrival of the gate order on lead 64. The pulse on lead 65 is applied to the inhibit terminal 221 of the inhibit unit 222, and blocks any possible output from the inhibit unit. A clear order pulse on lead 69 therefore sets memory unit 223 to the "1" state, and the current switch 213 is thereafter in the off condition. A pulse from lead 217 arrives at And unit 225 concurrently with the arrival of a gate order on lead 64, and the memory unit 226 is set to the "0" state. The current switch 214 is then turned on. The presence of an enable order on lead 65 concurrently with the arrival of a gate order on lead 64 enables all of the And units in circuit 215, and registers the selected seven digits in the current switches of circuit 215. This last operation is described in detail above in connection with Fig. 5. Under the foregoing conditions, the meter 56 has a reading between center and its maximum positive value.

When the number is positive and when there are "skipped bits" present (Example (2) of Table II), there will be a pulse on lead 217, but no pulse on the output lead 65 from the "skipped bits checker." With pulses from leads 64 (the gate order) and 217 present at the two normal inputs of the inhibit unit 222, and no pulse present at the inhibit input terminal 221, the inhibit unit will have an output pulse. This output pulse appears at the "set 0" input of the memory unit 223 and over-rides the clear order pulse on lead 69 which arrives concurrently at the "set 1" input of the memory unit 223. Accordingly, the current switch 213 is turned on. Inasmuch as the And unit 225 has the same inputs as the normal inputs to the inhibit unit 222 as described above, the current switch 214 associated with And unit 225 is also turned on. However, with no pulse present on lead 65, none of the And units in circuit 215 are enabled, and none of the current switches in circuit 215 can be turned on. Under these circumstances, meter 56 reads full scale in the positive direction, as it should to indicate that a larger scale should be selected so that there will be no "skipped bits."

When the number is negative, there is no pulse on lead 217. Because pulses from lead 217 are required inputs for the energization of both inhibit unit 222 and And unit 225, neither of the associated current switches 213 or 214 can be energized when negative numbers are being converted. When there are no "skipped bits" present, an enable pulse on lead 65 permits the energization of the And units in circuit 215, and meter 56 will read between its maximum negative reading at the far left-hand side of the meter scale and its central zero indication. When there are "skipped bits" present, lead 65 will not be energized and none of the current switches which supply current to meter 56 will be energized. The meter properly has a maximum negative indication to show that a different scale should be selected by the operator.

As mentioned above, the inhibit unit 219 in which the normal input is grounded "negates" signals applied to the inhibit terminal 231. The term "negate" means that a "0" is transformed into a "1," and a "1" is transformed into a "0." Thus, pulses applied at terminal 231 of inhibit unit 219 are changed into spaces at the output circuit 217 of the inhibit unit; and the output circuit 217 will be energized when there are no pulses applied to terminal 231.

In the computer technology described in the article and patent application of J. H. Felker cited above, the inhibit units and the And units both include a pulse regenerator circuit. A standard frequency source or "clock" signal having the same pulse repetition rate as the serial binary numbers mentioned above is connected to each pulse regenerator. The "clock" signal provides a gating voltage so that the pulse regenerator produces accurately timed output pulses when the appropriate input signals to the inhibit or And units are present. The input signal pulses to the inhibit units and the And units are positive going pulses which rise from a negative value to about ground potential. Accordingly, when the input terminals of one of the inhibit units or And units are grounded, it has the same effect as the application of a continuous train of control pulses from an external source.

Applying the principles set forth in the foregoing paragraph to the inhibit unit 219 of Fig. 8, it may be noted that the normal input to the inhibit unit is grounded. In the absence of pulses applied to the inhibit terminal 231 of the inhibit unit 219, the source of clock pulses which is connected internally to the inhibit unit 219 will start a train of pulses which will appear at the output 217 of the inhibit unit. When a pulse is applied to inhibit terminal 231 of inhibit unit 219, however, the output pulses are blocked and no pulse appears on lead 217. Accordingly, the inhibit unit 219, with its normal input terminal grounded, acts as a "negator" and changes signal pulses applied to inhibit terminal 231 to spaces at the output of the inhibit unit and, conversely, changes spaces at the input of the inhibit unit to pulses at output lead 217.

The gate order and the clear order which appear on leads 64 and 65, associated with the circuits of Meter No. II, are derived from the signal applied to lead 195 at the far left-hand side of Fig. 8. A pulse on lead 195 sets memory unit 189 to its "1" state. The memory unit 189 thereafter produces a continuous train of output pulses. The And unit 233 receives pulses from the memory unit 189 and also is connected to lead 203, which provides one pulse every sixteen microseconds, or every sixteen digit periods. Pulses from lead 203 are also applied to And unit 234, but are blocked at this And unit, because memory unit 188 is set to the "0" state. The delay units 232, 235, and 236 are required to obtain the proper timing of the arrival of the gate and clear orders at the digital to analog current decoder for Meter No. II.

When pulses are applied to lead 187, Meter No. I is selected by the energization of memory unit 188, and the de-energization of memory unit 189 associated with the control circuits for Meter No. II. When memory unit 188 is selected, the gate and clear orders are applied to leads 63 and 68 associated with Meter No. I. Under these circumstances, the current switches 241, 242 and the current switches in circuit 243 will supply current to the weighting circuit 245 in substantially the same manner as discussed above for the current switches 213, 214, and the current switches in circuit 215. Accordingly, Meter No. I will be deflected to yield the proper analog representation of the digital numbers applied to lead 52 (see the left-hand side of Fig. 8), just as Meter No. II represents numbers applied to lead 52 when the control lead 195 is energized. It is also apparent that additional decoding circuits and associated meters may be connected to the delay line of circuit 215, and thus that many digital quantities may be decoded and displayed by the common control circuitry.

It is to be understood that the above-described arrangements are illustrative of the application of the principles of the invention. Numerous other arrangements may be devised by those skilled in the art without departing from the spirit and scope of the invention.

What is claimed is:

1. In combination, means supplying a serial binary digital representation of a quantity having a predetermined number of digits, means for converting a lesser number of said binary digits into analog form, a variable delay circuit coupling said multi-digit representation to said conversion means, scale switching means for changing the delay of said delay circuit and thus changing the selected group of digits applied to said conversion means, and means for indicating the presence of a digit of greater significance than the most significant digit in said selected group of digits.

2. In a digital to analog converter, means providing a serial binary number having a predetermined number of digits in electrical pulse code form, tapped delay line means for accommodating a lesser number of consecutive digits selected from said binary number, variable delay means for coupling said binary number to said tapped delay line, a plurality of analog weighting circuits coupled in parallel to the taps on said delay lines for converting the digital indications on said delay line into analog form, a like plurality of analog display devices coupled respectively to said weighting circuits, means for enabling one of said weighting circuits and thereby energizing the associated display device, and means for indicating the presence of digits of greater significance than the most significant digit in the selected group of consecutive digits.

3. In a digital to analog converter, means providing a serial binary number having a predetermined number of digits in electrical pulse code form, a tapped delay line, a variable delay circuit means for coupling a lesser number of consecutive digits selected from said binary number to said tapped delay line, a plurality of analog weighting circuits coupled in parallel to the taps on said delay lines for converting the digital indications on said delay line into analog form, a like plurality of analog display devices coupled respectively to said weighting circuits, means for enabling one of said weighting circuits and thereby energizing the associated display device, means for detecting the presence of digits of greater significance than the most significant digit in the selected group of consecutive digits, and means responsive to said detection means for making the display device associated with the selected analog weighting circuit read full scale when said more significant digits are present.

4. In a digital to analog converter, means providing a serial binary number having a predetermined number of digits appearing in successive digit periods in electrical pulse code form, means including a tapped delay line for accommodating a lesser number of consecutive digits selected from said binary number, variable delay means for coupling said binary number to said tapped delay line, switching means for changing the delay of said variable delay means by an integral number of digit periods, an analog weighting circuit means coupled to the taps on said delay line for converting the digital indications on said delay line into analog form, an analog display device coupled to said weighting circuit, control means for energizing said weighting circuit following the application of said serial binary number to said variable delay means, and means for indicating the presence of any digit of greater significance than the most significant digit in the selected group of consecutive digits.

5. In a digital to analog converter, means providing a serial binary number having a predetermined number of digits appearing in successive digit periods in electrical pulse code form, means including a tapped delay line for accommodating a lesser number of consecutive digits selected from said binary number, variable delay means for coupling said binary number to said tapped delay line, switching means for changing the delay of said variable delay means by an integral number of digit periods, an analog weighting circuit coupled to the taps on said delay line for converting the digital indications on said delay line into analog form, and an analog display device coupled to said weighting circuit.

6. In a digital to analog converter, means providing a serial binary number having a predetermined number of digits appearing in successive digit periods in electrical pulse code form, means including a tapped delay line for accommodating a lesser number of consecutive digits selected from said binary number, variable delay means for coupling said binary number to said tapped delay line, switching means for changing the delay of said variable delay means by an integral number of digit periods, an analog weighting circuit coupled to the taps on said delay line for converting the digital indications on said delay line into analog form, an analog display device coupled to said weighting circuit, and means for indicating the presence of any digit of greater significance than the most significant digit in the selected group of consecutive digits.

7. In combination, means providing a multi-digit representation of a quantity, the digits of said representation being arranged consecutively in order of their respective significances, circuit means for converting a lesser number of digits selected from said digital representation into a visible analog representation of said quantity, means for selecting digits from said representation and applying them to said conversion means, switching means for changing the digits selected by said selection means, and means for indicating the presence in said multi-digit representation of any digit of greater significance than said selected digits.

8. In combination, means supplying a multi-digit representation of a quantity, means for converting a predetermined group of said digits into analog form, means for selecting said group of digits and applying them to said conversion means, scale shifting means associated with said selection means for changing the group of digits applied to said conversion means, and means indicating the presence of any digit of greater significance than the most significant digit in said selected group of digits.

References Cited in the file of this patent

UNITED STATES PATENTS

| | | |
|---|---|---|
| 2,630,481 | Johnson | Mar. 3, 1953 |
| 2,630,552 | Johnson | Mar. 3, 1953 |
| 2,643,355 | Hallman | June 23, 1953 |